United States Patent [19]

Schroeder et al.

[11] Patent Number: 5,116,629

[45] Date of Patent: May 26, 1992

[54] PROCESSED MEAT PRODUCTS CONTAINING FISH OILS STABILIZED WITH FRUCTOSE

[75] Inventors: Lisa R. Schroeder, Plymouth; Dorothy J. Muffett, Bloomington, both of Minn.

[73] Assignee: General Mills, Inc., Minneapolis, Minn.

[21] Appl. No.: 740,698

[22] Filed: Aug. 6, 1991

Related U.S. Application Data

[63] Continuation-in-part of Ser. No. 603,270, Oct. 24, 1990, abandoned, which is a continuation of Ser. No. 449,239, Dec. 7, 1989, abandoned, which is a continuation of Ser. No. 191,946, May 9, 1988, abandoned.

[51] Int. Cl.$^5$ ............................................. A23L 1/317
[52] U.S. Cl. ................... 426/545; 426/546; 426/646
[58] Field of Search ............... 426/544, 545, 546, 641, 426/643, 646, 652, 804

[56] References Cited

U.S. PATENT DOCUMENTS

| | | | |
|---|---|---|---|
| 2,198,212 | 4/1940 | Musher | 426/546 |
| 4,357,362 | 11/1982 | Barker | 426/643 |
| 4,363,823 | 12/1982 | Kimura et al. | 426/544 X |
| 4,764,392 | 8/1988 | Yasufuku et al. | 426/603 |
| 4,765,927 | 8/1988 | Nomura et al. | 426/545 |
| 4,963,380 | 10/1990 | Schroeder et al. | 426/544 X |

FOREIGN PATENT DOCUMENTS 187148 11/1983 Japan ............................... 426/641

*Primary Examiner*—Arthur L. Corbin
*Attorney, Agent, or Firm*—Dorsey & Whitney

[57] ABSTRACT

Disclosed are processed meat food products, especially 1) sectioned and formed meat formulations, and 2) sausages, especially emulsion types, which contain nonhydrogenated fish oil yet which exhibit enhanced stability of the fish oil against flavor and aroma degradation. The improved processed meat food products are stabilized by the incorporation of fructose in the food product such that the weight ratio of fructose to fish oil is at least about 0.05:1. Surprisingly, incorporation of modest amounts of fructose into processed meat food products within the indicated minimum provides a stabilizing effect on the highly unstable fish oil. The present invention finds particular suitability for use in connection with fish oils rich in omega-3-fatty acids.

13 Claims, No Drawings

PROCESSED MEAT PRODUCTS CONTAINING FISH OILS STABILIZED WITH FRUCTOSE

This is a continuation-in-part of Ser. No. 07/603,270 filed Oct. 24, 1990 (now abandoned); which is a continuation of Ser. No. 07/449,239 filed Dec. 7, 1989 (now abandoned); which is a continuation of Ser. No. 07/191,946 filed May 9, 1988 (now abandoned).

BACKGROUND OF THE INVENTION

1. Technical Field

The present invention relates to food products. More particularly, the present invention relates to processed meat products containing fish oils characterized by better flavor and enhanced stability.

2. Background Art

A great deal of attention has recently been focused on the various health benefits apparently associated with consumption of fish oil. Health benefits appear to be related to the presence of high levels of the n-3 family of polyunsaturated fatty acids. Oils containing such materials, such as fish oils, are referred to as "omega-3" oils ana desirably contain high levels of n-3 fatty acids, especially eicosapentaenoic acid ("EPA") and docosahexaenoic acid ("DHA"). Such fatty acids are called "omega-3" since the first double bond occurs in the third carbon bond counting from the end or omega position of the fatty acid.

Notwithstanding the present interest in the health benefits of fish oil consumption, nonhydrogenated fish oil generally to date has not been widely used per se or as an ingredient in processed food products for use by humans due to notorious and severe problems in odor, flavor, and especially stability, primarily due to oxidative and other reactions resulting in fishy off-flavor development. Unfortunately, nonhydrogenated fish oils exhibit notorious instability due in part to the reactivity of their unsaturatea bonds. Indeed, it is this reactivity which makes fisn oils appealing for such non-food uses such as a drying agent in paints. However, gelatin capsules containing fish oil are available. Additionally, salmon oil has been added to canned salmon. Also, certain canned meat products have been marketed in Japan which have had refined fish oil added as a fortifier.

Hydrogenated fish oils are much more stable due to the decrease in the degree of polyunsaturation and are widely used in Europe for margarine. Hydrogenated fish oils have also been used in Scandinavian countries in other consumer products, e.g., cake mixes. Hydrogenation is also effeclive ln reducing odor and flavor after deodorization. However, hydrogenation by decreasing polyunsaturation including the n-3 fatty acid component correspondingly decreases the health value of fish oil. Accordingly, it would be desirable to realize a nonhydrogenated fish oil or food products containing such nonhydrogenated fish oils, but nonetheless of increased stability.

The principal approach taken in the art to utilize nonhydrogenated fish oil has been to employ fish oils of enhanced stability. Two broad approaches have been taken in the art to realize nonhydrogenated fish oils of enhanced stability. The first approach involves giving attention to the processing of the oil to achieve a cleaner, finished oil product. Particular attention has been given to the deodorization step in order to realize cleaner finished fish oil products.

In the second approach, the art has attempted to find adjuvants which can be added to finished fish oil to provide desired additional stability. For example, while the phenomenon of fish oil degradation is not completely understood, it is known, however, that oxidative rancidification is a contributing factor. Addition of known antioxidants, singly as well as commercial mixtures, some allegedly synergistic, does result in some increase in stability. However, the instability of nonhydrogenated fish oils is so great, that even addition of such materials at maximum legally permitted levels provide only modest increases in stability.

Given the severe difficulties in realizing a suitable fish oil ingredient, it is understandable that comparatively little developmental effort has been made to formulate processed food products containing fish oil.

The prior art also includes U.S. Pat. No. 4,357,362 (issued Nov. 2, 1982 to David Barker). This patent discloses a pet food composition including fish material of reduced fishy odor by subjecting the composition in a sealed container to sterilizing neat in the presence of a reducing agent. However, several disadvantages exist with this approach. First, the primary advantage is a fish odor reduction which is not necessarily correlated to reduction of fishy flavors resulting from oil degradation. Second, a severe heat treatment in a sealed container is required in order to achieve the reduction in odor. It is undesirable for many foods to be subjected to such severe heat treatment. Third, fish flesh or other fish proteinaceous material, an essential ingredient of these pet foods, is known to have a material beneficial effect on fish oil stability. However, many food products cannot contain fish flesh or such other fish proteinaceous material, e.g., mayonnaise, yet could beneficially include fish oil were oil stability nonetheless obtained. Also, the product is inherently less susceptible to oxidative degradation since it is sealed. Finally, a wide variety of organic and inorganic reducing agents are taught as useful although reducing sugars are preferred.

Given the state of the art with regard to fish oil stabilization, there is a continuing need for the development of new and improved processed food products containing fish oil of improved stability.

Accordingly, it is an object of the present invention to provide products containing nonhydrogenated fish oils which nonetheless exhibit improved stability against degradation in both flavor and odor.

It is another object of the present invention to provide food products of enhanced stability which do not require heat sterilization.

Another object of the present invention is to provide food products containing fish oil which do not require fish flesh, fish meat or other fish proteinaceous material.

Still another object of the present invention is to provide food products containing fish oil of enhanced stability against flavor degradation.

It has been surprisingly discovered that the above objectives can be realized and superior processed meat products containing fish oils can be prepared by incorporation of modest amounts of fructose. Surprisingly, fructose alone among sugars and other materials appears to be unexpectedly superior in providing the desired stabilization benefits.

Throughout the specification and claims, percentages are by weight and temperatures are in degrees Fahrenheit unless otherwise indicated.

SUMMARY OF THE INVENTION

The present invention relates to processed meat products other than fish meat containing fish oils of enhanced stability. In addition to common processed meat ingredients, the present food products comprise finished fish oils stabilized with minor amounts of fructose in combination with other fish oil stabilizers. The meat products are essentially free of fish flesh, fish meat or other fish proteinaceous material.

DETAILED DESCRIPTION OF THE INVENTION

The present invention resides in nutritious, processed meat products containing fish oil but which are substantially free of fish flesh, fish meat or other fish proteinaceous material. Nonetheless, the present meat products are characterized by enhanced oil stability by virtue of the incorporation of minor amounts of fructose.

The art of providing processed meat products is well developed and the skilled artisan will have no difficulty selecting particular formulations or product preparation techniques for use herein. A good description of processed meat technology, including formulations and product preparation processing is, for example, contained in "Processed Meats" Second Edition by A. M. Pearson and F. W. Taiber, Avi Publishing Company, Inc., Westport, Conn. The term "processed meat products" is used herein conventionally to refer to a wide variety of meat based food products. The term "processed meat products" is intended to embrace both 1) sectioned and formed meat formulations, sometimes referred to as "luncheon meats" e.g., ham loaf, turkey loaf or roll, etc., and 2) sausages of all types. Sausages generally include 1) ordinary or ground sausage, 2) semi dry or summer sausage, 3) dry or hard sausage, and 4) emulsion sausages such as bologna. Both summer sausage and dry sausages are fermented products. The present invention is particularly suitable for use in emulsion type sausages. Processed meat products, however, are to be distinguished from merely various meat cuts obtained by conventional butchering.

In the preparation of processed meat products, the meat(s) must be reduced in size, the meat pieces admixed with other ingredients, the mix formed into desired shapes or sizes, and a gel formed or allowed to set. A very wide variety of variations in these steps is practiced depending on such factors as meat sources, whether gelling agents or adjuvants are employed, and the type of product desired. Additionally, a variety of optional additional steps can also be practiced including, for example, fermenting, curing, smoking, drying and cooking. The steps can be practiced in varying orders as well.

The present invention finds particular suitability for use in connection with emulsion type sausages such as bologna. While the following description is specifically directed at such products, it will be appreciated that other sausage and meat products can also be prepared in comparable manner by the skilled artisan within the scope of the present invention.

Emulsion sausages are sometimes also referred to as cooked sausages. Exemplary varieties include frankfurters, or synonomously, wieners, franks, or hotdogs, and bologna, knockwurst and similar products and, if liver meat is added, Braunschweiger, also called liverwurst.

In such traditional emulsion sausage production the following operations are performed separately. First, a mechanical comminution of the meat(s) begins in a mincing machine and continues in a cutter. The membranous sheath of the muscle is thereby opened. Frequently a small quantity, i.e., up to about 3% of the final formulation of a solvent in the form of cooled water or ice is added to facilitate chopping or mixing or to dissolve the curing ingredients thereby forming a base meat emulsion. In certain embodiments, the comminuting step is practiced so as to partially solubilize the meat protein which in subsequent steps is set to form the gel holding the meat product together in a solid mass. Secondary or additional materials are then pre-comminuted in the mincing machine and the fine comminuition takes place in the cutter while admixing the basic meat emulsion until a complete emulsification of this mixture is obtained. Such secondary materials can include fat, nitrite pickling salt, condiments, seasonings, spices and reddening substances. Various gelling salts or other gelling agents can be added so as to assist in the gel formation. The fat is admixed by the frictional action of the cutter blade and the final product is a fat-water-protein emulsion in which the dissolved protein assumes the part of the emulsifier and stabilizer. The mixture can then be stuffed into a conventional skin casing or otherwise conventionally formed into desired shape, optionally hot smoked, and scalded for the purpose of heat coagulation. In the preparation of various sausage products, the process can further involve one or more of the steps of fermenting, curing, drying and smoking which steps can be practiced in various orders and combinations.

A meat or meat characterizing ingredient(s) is the first major constituent of the present processed meat products. Exemplary meat characterizing ingredients can include all conventional meats including primarily beef, pork, chicken, turkey, venison, veal and mixtures thereof. Also useful herein are various meat by-products and organ parts which are also known as variety meats. Especially preferred for use herein are the meats from beef, poultry, pork and mixtures thereof. The meat or meat characterizing ingredient can comprise from not less than about 10% to 80%, preferably not less than 30% or 30% to 75% of the processed meat. For best results, the meat comprises about 50% to 70% of the meat product.

Another essential ingredient of the present processed meat product is a fish oil. The present processed meat products are a convenient vehicle for delivery for consumption of fish oil to obtain the desirable special nutritional advantages provided by fish oil. The particular concentration of fish oils will of course vary depending upon such factors as type of processed meat product being prepared. Generally the fish oils can comprise from about 0.1% to 15%, preferably about 1% to 10% of the product. For best results, the product comprises about 2% to 5% fish oil. The fish oil can be conveniently added to the cutter to load or blend the fat into the basic meat emulsion. By regulation, the maximum fat content of sausages is 30%. Thus, the fish oil and other fat constituents contents are selected such that the total fat contents are within the prescribed limits.

Fish oils are staples of commerce and their general processing is well known (see, for example, Fish Oils Their Ohemistry, Technology, Stability, Nutritional Properties, and Uses, ed. by M. E. Stansby, The Avi Publishing Company, Inc. 1967 and which is incorporated by reference). Especially useful for their therapeutic value herein are nonhydrogenated fish oils having a total n-3 fatty acid content of greater than about 20% such as are derived from menhaden oil, herring, capelin, anchovy, cod liver, salmon oil, sardine oil and mixtures thereof. Especially preferred for use herein is menhaden oil due to such supply considerations as cost and availability as well as its nutritional quality as being high in omega-3 fats. The fish oils can be conventionally processed, e.g., refined and deodorized, to provide what is referred to in the art as a "finished" oil. Unlike vegetable oils, however, fish oils typically do not require degumming. Also, conventional hydrogenation of the fish oils such as is done to make the oil suitable for use for the preparation of margarine is to be strictly avoided.

Preferably, the fish oils useful herein are processed according to the methods described in U.S. Pat. No. 4,804,555 of Marschner et al. entitled "Physical Process for Simultaneous Deodorization and Cholesterol Reduction of Fats and Oils" (which is incorporated herein). The process there disclosed involves a process involving deaerating fish oil, mixing the oil with steam, heating, flash vaporization, and thin film stripping with counter current steam (all steps being performed under vacuum). The finished fish oil prepared according to this method is additionally characterized both by reduced cholesterol (generally at cholesterol levels of less than about 400 mg/g, preferably less than about 250 mg/g) and enhanced stability by enhanced initial quality.

It is essential that the present processed meat products containing fish oil also contain fructose in order to realize the oil stability advantages discovered herein. The fructose can be added along with the other dry ingredients. It is essential that meat products comprise fructose such that the weight ratio of fructose to fish oil ranges from about 1 to 100:100. Insufficient fructose can result in rapid deterioration of quality of the food product. As the oil degrades, the resultant fishy flavor and aroma increases rendering the food product increasingly unpalatable. Excessive fructose levels can result in products characterized by undesirable sweetness without obtaining proportional increases in oil stability, if any. Better results in terms of obtaining oil stabilization benefits without excessive sweetness are obtained when the meat products contain fructose to oil in a ratio of at least 10:100. Best results are obtained when the processed meat products contain fructose to oil in a ratio of 20 to 100:100.

The fructose can be provided from both relatively pure and less pure sources. While pure crystalline fructose of various types and sources are commercially available, fructose in the form of 90% fructose high fructose corn syrup, is practical from both a source availability and cost standpoint. Thus in certain embodiments, high fructose corn syrup functions not only to provide the essential fructose fish oil stabilizer, but also functions as a sweetener. Less preferred but nonetheless useful herein are less pure sources of fructose such as other, lower D.E. corn syrups, e.g., 42% fructose high fructose syrup, honey, maple syrup solids, fruit juice solids and the like.

Surprisingly, only fructose has been found to provide the high stabilization benefits of the present invention at the concentrations taught as essential herein. Other reducing agents, whether organic or inorganic have not been found to provide the combined advantages of fructose of stabilization at relatively low levels and without cloying sweetness. Glucose, a closely related sugar, has been found to exhibit some fish oil stabilization activity. However, relative to fructose at the same level, it is much less effective. Xylose has also been found to have some fish oil activity, but due to its costs and commercial availability it is not a good substitute for fructose.

Of course, the present food compositions will essentially include conventional oil stabilizing materials at high or their maximum permitted levels (e.g., 200 ppm of total oil) such as antioxidants, TBHQ, (tertiary Butylhydroquinone) BHA (Butylated Hydroxyamisole) or BHT (Butylated Hydroxytoluene). Not all food approved antioxidants have been shown to help. For example, the use of lecithin nas been shown to actually aggravate development of fishy flavors.

A further requirement of the present invention is that the processed meat product be substantially free of any fish flesh, fish meat or other fish proteinaceous material having a beneficial effect on the stability of fish oil. Thus, the term fish proteinaceous material as used herein is intended to mean fish flesh, fish meat or any other fish material (whether considered to be edible or not) such as fish offal and the like which are known to have, or which have, a beneficial stabilizing effect on fish oil.

In another aspect, the present invention resides in part in the discovery that a specific combination of antioxidants, namely, the combination of TBHQ and vitamin E, has unexpectedly been found to be superior to other antioxidants senerally considered to be equivalent or substitutes when used in combination with the fructose. Thus, even more preferred processed meat products further include 1 to 2000 ppm tocopherol in addition to the antioxidants especially when TBHQ is the principle or sole antioxidant. Still more preferred products include 10 to 150 ppm (based on total oil) of a chelating agent, e.g., citric acid. The food products can also beneficially include about 0.1% to 1% of an oil soluble flavor masking agent based or the weight of the fish oil. Especially useful hereln as masking flavor agents are citrus oils such as lemon oil.

OPTIONAL INGREDIENTS

Ice or cooled water, if employed as described above, can comprise from about 0.1 to 3% of the formulation. Another preferred optional ingredient is a nonmeat material or filler also referred to in the art as an extender and/or binder. Suitable materials for use as fillers include various grains or "cereal fillers" based upon wheat, rice, corn, barley, etc., vegetable starch, starch vegetable flour, soy flour, soy protein concentrate, isolated soy protein, non-fat dry milk, calcium reduced skim milk, and dried milk. These materials may be used alone or in combination from about 0.1% to 3.5% of the finished product.

Other additional optional materials can include any number of adjuvant materials suitable for enhancing the appearance, nutritional, organoleptic or other attributes of the present processed meat products. Exemplary materials inclube flavors, colorants, vitamins, and preservatives. If present, such adjuvant materials can each comprise from about 0.01% up to 2% of the product. Condiments such as seasonings and pickling agents can also be added at conventional condiment levels typically ranging from about 0.1% to 3%.

The present emulsion embodiment meat products are in the form of oil-in-water stable emulsions. The term "stable" is meant to refer to those compositions which exist in emulsion form for extended times rather than quickly breaking aown into non-intermixed water and oil phases. Stable emulsions, in contrast to unstable emulsions, show readily apparent fish oil stability improvement benefits when fructose is present within the defined ranges.

The meat products are conventionally packaged for refrigerated or frozen storage and distributior,. Thus, while the present products can be canned, such packaging is neither essential nor preferable.

Without further elaboration, it is believed that one skilled in the art can, using the preceding description, utilize the present invention to its fullest extent. The following preferred specific embodiments are, therefore, to construed as merely illustrative and not limitative of the remainder of the disclosure whatsoever. It will be appreciated that other modifications of the present invention, within the skill of those in the food arts, can be undertaken without departing from the spirit and scope of this invention.

EXAMPLE 1

Fresh Pork Sausage

Processed meat products of the present invention can be prepared having the following formulations:

| Ingredients | lb | oz |
| --- | --- | --- |
| Formula 1 | | |
| Pork trimmings (75% lean) | 100 | — |
| Salt | 1 | 10 |
| White pepper | — | 5 |
| Sage | — | 2 |
| Mace | — | 1 |
| Fish oil[1] | 5 | — |
| High fructose corn syrup (90 D.E.) | 2 | — |

| Formula 2 | | |
| --- | --- | --- |
| Pork trimmings (75% lean) | 85 | — |
| Fresh belly trimmings | 15 | — |
| Salt | 1 | 12 |
| White pepper | — | 4 |
| Sucrose | — | 3 |
| Sage | — | 2 |
| Ginger | — | 0.5 |
| Fish Oil[1] | 3 | — |
| High fructose corn syrup (90 D.E.) | 1 | 8 |

| Formula 3 | | |
| --- | --- | --- |
| Pork trimmings (75% lean) | 70 | — |
| Neck-bone trimmings | 30 | — |
| Salt | 2 | 12 |
| White pepper | — | 4 |
| Fish oil[1] | 3 | — |
| High fructose corn syrup (90 D.E.) | 1 | 8 |

[1] A refined, nonhydrogenated menhaden oil containing 200 ppm TBHQ, 2,000 ppm tocopherol, 30 (ppm/%) citric acid.

A small quantity, about 4,000 g, of any of the above formulations are prepared by making a pre-blend of all dry ingredients and a second pre-blend of all wet ingreaients. Thereafter, the dry pre-blend is admixed with the wet pre-blend in a kitchen blender. To the admixture is added the oil based ingredients. Thereafter, the composion is blended at high speed for 50 seconds to form a stable emulsion. The stable emulsion is then stuffed into sausage casings, packaged and cool stored.

Processed meat products of comparable organoleptic attribites and fish oil stability are obtained when the high fructose corn syrup is replaced with other less pure fructose sources at equivalent fructose levels including 42% fructose corn syrup.

EXAMPLE 2

A skinless polish sausage of the present invention is prepared according to the procedure of Example 1 having the following formulation:

| Ingredients | lb | oz |
| --- | --- | --- |
| Formula 1 | | |
| Beef trimmings (80% lean) | 40 | — |
| Pork cheeks | 35 | — |
| Regular pork trimmings | 25 | — |
| Ice | 10 | — |
| Salt | 2 | — |
| Ground black pepper | — | 2 |
| Marjoram | — | 1 |
| Sodium nitrite | — | 0.25 |
| Garlic | — | 0.25 |
| Fish oil[1] | 3 | — |
| High fructose corn syrup | 1 | 8 |

[1] A refined, nonhydrogenated menhaden oil containing 200 ppm TBHQ, 2,000 ppm tocopherol, 30 (ppm/*~O) citric acid.

| Formula 2 | | |
| --- | --- | --- |
| Pork cheeks | 40 | — |
| Beef trimmings 80°/c lean) | 30 | — |
| Regular pork trimmings | 30 | — |
| Ice | 10 | — |
| Salt | 2 | — |
| Ground black pepper | — | 2 |
| Marjoram | — | 1 |
| Sodium nitrite | — | 0.25 |
| Garlic | — | 0.25 |
| Fish oil[1] | 3 | — |
| High fructose corn syrup (90% fructose) | 1 | 8 |

[1] A refined, nonhydrogenated menhaden oil containing 200 ppm TBHQ, 2,000 ppm tocopherol, 30 (ppm/%) citric acid.

EXAMPLE 3

Preparation of Cooked Liver Sausage 1,500 g of liver are finely comminuted in a meat sausage cutter while adding 30 g of pickling salt. Then 1,5009 of boiled and pickled lean pork meat are also finely cominuated in the cutter and mixed and homogenized with 750 g milk, 100 g fish oil, and 300 g of boiled onions. To this composition there is added the precomminuted liver together with 500 g of cooking broth, 100 g of flavor enhancers, 30 g of seasoning for liver sausages, 30 g of a reducing agent such as ascorbic acid and 50 g high fructose corn syrup. The whole mixture is then thoroughly homogenized. The composition thus prepared is filled in a 45-diameter sterilized skin, refined at 75° C. for 45 minutes and then cooled in water having a temperature of about 40° C. The fish oil contained as antioxidants the following: 150 ppm of THBQ and 1500 ppm of tocopherol.

EXAMPLE 4

Salami (Hard)

| Ingredients | lb | oz |
|---|---|---|
| Beef chunks | 40 | — |
| Pork jowls, glands trimmed | 40 | — |
| Regular pork trimmings | 20 | — |
| Salt | 3 | 8 |
| Sucrose | 1 | 8 |
| White pepper | — | 3 |
| Sodium nitrate | — | 2 |
| Garlic powder | — | 0.25 |
| Fish oil | 2 | 8 |
| Antioxidant blend[1] | — | 0.1 |
| High fructose corn syrup | 1 | 8 |

[1]Antioxidant blend consisting of 60% tocopherol available from Henkel Corporation under the trade name Covi-OX T70, 30% TBHQ mixture of (32% glycerol monoleate, 30% corn oil, 20% TBHQ, 15% propylene glycol and 3% citric acid) available from Eastman Chemical Products Inc. under the trade name TENOX 20A, and 10% partially hydrogenated soybean oil with BHA to help protect flavor available from Durkee Industrial Foods, under the trade name Durkex 100.

The sausages are prepared by first grinding the beef through a ⅛-in. plate and the pork through a ¼-in. plate. All the ingredients are then mixed in a mixer for 5 minutes or until a good distribution of the lean meat and fat is apparent.

The mix is then stored in trays 8 to 10 in. deep for 2 to 4 days at 40° to 45° F. to age and to ferment the emulsion. The aged and fermented emulsion is next stuffed into No. 5×22 fibrous casings, sewed bungs, or suitablysized collagen casings. The stuffed product is dried for 9 to 11 days at 40° F. and 60% relative humidity.

Holding times both during fermentation and drying can be greatly reduced if starter cultures are used.

EXAMPLE 5

All Meat Bologna

| Ingredients | lb | oz |
|---|---|---|
| Whole-carcass beef | 60 | — |
| Regular pork trimmings | 40 | — |
| Ice | 25 | — |
| Fish Oil | 3 | — |
| Sucrose | — | 8 |
| Fructose | 1 | 8 |
| Ground white pepper | — | 4 |
| Coriander | — | 1 |
| Mace | — | 1 |
| Sodium erythorbate | — | 0.85 |
| Sodium nitrite | — | 0.25 |
| Antioxidant blend[1] (per Example 4) | — | 0.14 |

The bologna is prepared by first grinding the beef through a ¼-in. plate and the pork through a ⅜-in. plate. The ground meats are mixed in a mixer with the fish oil spices, salt, sugars, erythorbate, and nitrite. Ice or equivalent weight of ice and water is added during the mixing operation. The blend is next passed through a double-plate emulsifier to develop the desired texture. The temperature rise of the mix passing through the emulsifier is usually 8° to 15° F.

The bologna meat emulsion can also be prepared in a conventional chopper by placing the ground beef in the chopper with half the ice. The salt, erythorbate, and sodium nitrite are each added and the blend is chopped to a smooth paste in approximately 5 minutes. The remaining ice, fish oil, spice, sugar(s), and pork trimmings are added and chopped to the desired texture, usually for an additional 5 minutes or until a temperature of 55° to 58° F. is achieved.

The finished bologna meat emulsion is transferred to a stuffer and then stuffed into casings. It is important to use as large a horn on the stuffer as is compatible with the casings. This permits lower stuffing pressures. A line pressure on the stuffer of 70 to 110 psi is usually required. A No. 8×36 in. fibrous casing gives a bologna of approximately 18 lb with a 15-in. circumference.

This size product requires approximately 8 hours in the smokehouse. It is best to start at a house temperature of 130° F. with the damper open. Cook for 30 minutes and then close the damper and raise the temperature 10° F./hr to 170° F. Continue to heat at 170° F. until an internal temperature of 156° F. is reached. After the product is cooked, the cooked product is then cooled with a cold water shower for 35–40 minutes. The cooked product is then held for at least 30 minutes at room temperature prior to placing the finished bologna in a 36° to 40° F. holding cooler.

EXAMPLE 6

10,000 g of lean meat are pre-comminuted in a sausage meat mincing machine and then finally comminuted in a meat cutter, while adding 80 g of phosphate and 200 g of table salt. In this composition 6,000 g of frozen skimmed milk is emulsified in the cutter. There is likewise blended in the cutter 1600 g of antioxidant containing fish oil and 1200 g of high fructose corn syrup, 80 g of seasoning for fried sausages and 20 g of glutamate. This final emulsion was filled Into small chords sausage casings having a 18/20 diameter and boiled at 65° C. for 20 minutes. The sausages are then cooled in cold water.

The invention may be embodied in other specific forms without departing from the spirit or essential characteristics thereof. The present embodiments are therefore to be considered in all respects as illustrative and not restrictive. The scope of the invention being indicated by the appended claims rather than by the foregoing description, and all changes which come within the meaning and range of equivalency of the claims are therefore intended to be embraced therein.

We claim:

1. A processed meat product, other than fish meat, containing fish oil, yet exhibiting enhanced stability against flavor degradation, wherein the product comprises:
   A. a meat ingredient, other than fish meat, in an amount of not less than about 30% of said meat product;
   B. a deodorized, nonhydrogenated fish oil in an amount of about 1% to 15% by weight of said meat product, said fish oil having
      1) about 150 to 250 ppm of a fish oil stabilizing antioxidant and
      2) about 1500 to 2000 ppm tocopherol; and
   C. fructose in an amount such that the weight ratio of fructose to said fish oil ranges from about 1 to 100:100;

wherein said meat product is substantially free of any fish proteinaceous material.

2. The meat product of claim 1 wherein the fish oil has a cholesterol level of less than about 450 mg/g.

3. The meat product of claim 1 comprising from about 1% to 10% by weight of fish oil.

4. The meat product of claim 3 wherein the weight ratio of fructose to fish oil ranges from about 10 to 100:100.

5. The meat product of claim 4 wherein the fish oil stabilizing antioxidant is selected from the group consisting of tertiary butyl hydroquinone, butylated hydroxyanisole, butylated hydroxytoluene and mixtures thereof.

6. The meat product of claim 5 wherein the fish oil stabilizing antioxidant is tertiary butyl hydroquinone.

7. The meat product of claim 1 wherein said fish oil further includes about 10 to 150 ppm of a chelating agent.

8. The meat product of claim 7 wherein said chelating agent is citric acid.

9. The meat product of claim 1 wherein said fish oil further includes about 0.1% to 1% by weight of an oil soluble flavor masking agent.

10. The meat product of claim 9 wherein said flavor masking agent is a citrus oil.

11. The meat product of claim 10 wherein citrus oil is lemon oil.

12. The meat product of claim 1 being substantially free of lecithin.

13. The meat product of claim 1 wherein said meat ingredient is in an amount not less than about 50% of said meat product.

* * * * *